(12) United States Patent
Tsubata

(10) Patent No.: US 7,710,530 B2
(45) Date of Patent: May 4, 2010

(54) COLOR FILTER SUBSTRATE AND DISPLAY APPARATUS USING THE SAME

(75) Inventor: Toshihide Tsubata, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 886 days.

(21) Appl. No.: 11/073,693

(22) Filed: Mar. 8, 2005

(65) Prior Publication Data

US 2005/0206812 A1    Sep. 22, 2005

(30) Foreign Application Priority Data

Mar. 16, 2004    (JP)    ............................. 2004-075193

(51) Int. Cl.
G02F 1/1339    (2006.01)
G02F 1/1335    (2006.01)
G02F 1/1333    (2006.01)

(52) U.S. Cl. .................. 349/156; 349/106; 349/110

(58) Field of Classification Search ............... 349/106, 349/155, 156, 110; 430/7
See application file for complete search history.

(56) References Cited

U.S. PATENT DOCUMENTS

| | | | | |
|---|---|---|---|---|
| 5,828,434 A * | 10/1998 | Koden et al. | ................. | 349/148 |
| 5,917,572 A * | 6/1999 | Kurauchi et al. | ............ | 349/156 |
| 5,946,070 A * | 8/1999 | Kohama et al. | ............. | 349/156 |
| 6,067,144 A * | 5/2000 | Murouchi | ................... | 349/156 |
| 6,281,960 B1 * | 8/2001 | Kishimoto et al. | .......... | 349/156 |
| 6,445,437 B1 * | 9/2002 | Miyazaki et al. | ............ | 349/156 |
| 6,610,997 B2 | 8/2003 | Murade et al. | | |
| 6,724,458 B2 * | 4/2004 | Kim et al. | .................... | 349/156 |
| 6,809,338 B2 | 10/2004 | Murade et al. | | |
| 7,061,569 B2 * | 6/2006 | Yun et al. | .................... | 349/158 |
| 7,142,277 B2 * | 11/2006 | Choi et al. | .................. | 349/155 |
| 2003/0123018 A1 | 7/2003 | Kim et al. | | |
| 2004/0201815 A1 * | 10/2004 | Yamamoto | .................. | 349/156 |

FOREIGN PATENT DOCUMENTS

| | | |
|---|---|---|
| JP | 8-114809 A | 5/1996 |
| JP | 10-82909 A | 3/1998 |
| JP | 11-023833 | 1/1999 |
| JP | 11-174463 A | 7/1999 |
| JP | 2000-29014 A | 1/2000 |
| JP | 2001-51266 A | 2/2001 |
| JP | 2001-100221 A | 4/2001 |
| JP | 2001-133787 A | 5/2001 |

(Continued)

*Primary Examiner*—James A Dudek
(74) *Attorney, Agent, or Firm*—Birch, Stewart, Kolasch & Birch, LLP

(57) ABSTRACT

A color filter substrate includes: an insulating transparent substrate; a color filter layer provided on the insulating transparent substrate, including a plurality of colored layers and constituting an in-screen display region; and an in-screen frame region defined around the in-screen display region. A light-blocking layer is provided in the in-screen frame region to cover the insulating transparent substrate. A first spacer part and a second spacer part are formed in the in-screen frame region and the in-screen display region, respectively, and are oriented substantially perpendicularly to the insulating transparent substrate. The sum of the height of the first spacer part and the thickness of the light-blocking layer is substantially equal to the sum of the height of the second spacer part and the thickness of the color filter layer.

11 Claims, 10 Drawing Sheets

FOREIGN PATENT DOCUMENTS

| | | |
|---|---|---|
| JP | 2002-55349 A | 2/2002 |
| JP | 2003-15136 A | 1/2003 |
| JP | 2003-167257 A | 6/2003 |
| JP | 2003-207788 A | 7/2003 |
| JP | 2003-337541 A | 11/2003 |
| JP | 2004-53654 A | 2/2004 |
| JP | 2004-61539 A | 2/2004 |

* cited by examiner

COLOR FILTER SUBSTRATE AND DISPLAY APPARATUS USING THE SAME

CROSS-REFERENCE TO RELATED APPLICATION

The disclosure of Japanese Patent Application No. 2004-75193 filed on Mar. 16, 2004, including specification, drawings and claims is incorporated herein by reference in its entirety.

BACKGROUND OF THE INVENTION

1. Field of the Invention

The present invention relates to a color filter substrate for use in a color liquid crystal display apparatus and a display apparatus using the color filter substrate.

2. Description of the Prior Art

Liquid crystal display apparatuses have features such as small size, small thickness, low power-consumption and light weight, and therefore are widely used in various electronic equipment. In particular, active matrix liquid crystal display apparatuses including switching elements are widely adopted in office automation equipment such as personal computers, AV equipment such as television sets and portable information equipment such as cellular phones. In addition, in recent years, the size of liquid crystal display apparatus has rapidly increased and display quality of the apparatus such as definition, pixel effective area ratio (i.e., aperture ratio), viewing angle and color purity has been rapidly improved.

The liquid crystal display apparatus includes an active matrix substrate and a color filter substrate opposing to each other and also includes a liquid crystal layer sandwiched and held between these substrates.

The thickness of this liquid crystal layer is called a cell gap or a cell thickness and is defined in such a manner that plastic beads with a given size are sprayed onto the active matrix substrate or the color filter substrate and the plastic beads are sandwiched and held as spacers between the substrates.

In this method of spraying spacers, plastic beads are generally sprayed by airflow, so that the locations of the plastic beads cannot be identified. Accordingly, beads spacers distributed at random locations in a pixel cause scattering or transmission of light, so that the problem of degradation of display quality arises in the liquid crystal display apparatus.

In each of the active matrix substrate and the color filter substrate constituting the liquid crystal display apparatus, an in-screen display region in which a large number of pixels as minimum units of an image and an in-screen frame region located around the periphery of the in-screen display region are defined.

The liquid crystal display apparatus is mounted on a casing or a frame having an opening. The in-screen display region and the in-screen frame region are located in the opening and a portion surrounding the opening, respectively.

In the in-screen display region of the active matrix substrate, a plurality of gate lines and a plurality of source lines are arranged to be orthogonal to each other and a switching element is provided at each intersection between the gate lines and the source lines. A pixel electrode constituting a pixel is provided in each region surrounded with a pair of gate lines and a pair of source lines.

In the in-screen frame region of the active matrix substrate, extended lines of the gate lines and the source lines in the in-screen display region and auxiliary lines for defect correction or inspection are arranged. A light-blocking layer is provided on the entire in-screen frame region.

The in-screen frame region is not directly related to image display and includes a light-blocking layer for blocking light from a backlight or the like that is necessary for image display in the in-screen display region. If the light-blocking layer is made of a photosensitive resin, this layer needs to be thick in order to enhance the light-blocking property. In addition, in the case of mounting the liquid crystal display apparatus on a casing or a frame, the light-blocking layer in the in-screen frame region coincides with the portion surrounding the opening thereof, so that the light-blocking layer needs to be wide in consideration of a mounting margin.

Accordingly, if this light-blocking layer is provided in the in-screen frame region, a level difference occurs between the in-screen display region and the in-screen frame region, so that the cell thickness differs between these regions. This difference in the cell thickness causes a phase difference (retardation) in display light near the boundary between the in-screen display region and the in-screen frame region, so that color irregularities due to variation of a color tone might be perceived.

In view of this, to identify the locations of spacers and to suppress color irregularities occurring near the boundary between the in-screen display region and the in-screen frame region, a method of providing columnar spacers made of, for example, a resin on a color filter substrate was proposed.

In Japanese Patent Publication No. 8-114809, a technique of providing dummy spacers in the outside of an effective screen is disclosed. However, no preferable configuration and locations of the dummy spacers are specifically described.

In Japanese Patent Publication No. 10-82909, columns are formed on a peripheral portion of a substrate coated with a seal member so as to obtain the function of controlling a gap between the substrate and an opposed substrate (a color filter substrate.) However, no specific configuration of the columns is described.

In Japanese Patent Publication No. 2001-100221, a technique of forming spacers with a uniform thickness by utilizing a dry-film laminating process during formation of a color filter is disclosed.

In Japanese Patent Publication No. 2001-51266, a technique of providing spacers in an in-screen display region, an in-screen frame region and a non-display region at the outer periphery of the in-screen frame region is disclosed. However, no thickness relationship among the spacers is specifically described.

SUMMARY OF THE INVENTION

However, in these conventional methods for forming spacers, spacers are only formed in specific locations on a color filter substrate, and occurrence of color irregularities near the boundary between the in-screen display region and the in-screen frame region is not suppressed.

It is therefore an object of the present invention to provide a color filter substrate for suppressing occurrence of color irregularities near the boundary between the in-screen display region and the in-screen frame region and a display apparatus using the color filter substrate.

To achieve the object, according to the present invention, spacers are provided on a color filter substrate or a color filter substrate constituting a display apparatus so as to adjust the cell thickness.

Specifically, a color filter substrate according to the present invention includes: a transparent substrate; a color filter layer provided on the transparent substrate, including a plurality of colored layers and constituting an in-screen display region; and an in-screen frame region defined around the in-screen display region, wherein a light-blocking layer is provided in the in-screen frame region to cover the transparent substrate, a first spacer part and a second spacer part are formed in the in-screen frame region and the in-screen display region, respectively, and are oriented substantially perpendicularly to the transparent substrate, and the sum of the height of the first spacer part and the thickness of the light-blocking layer is substantially equal to the sum of the height of the second spacer part and the thickness of the color filter layer.

In this structure, the first and second spacer parts are formed in the in-screen frame region and the in-screen display region, respectively, of the color filter substrate to be oriented substantially perpendicularly to the transparent substrate provided at the base of the substrate. In addition, the sum of the height of the first spacer part and the thickness of the light-blocking layer is substantially equal to the sum of the height of the second spacer part and the thickness of the color filter layer. Accordingly, the upper edge of the first spacer part in the in-screen frame region and the upper edge of the second spacer part in the in-screen display region are substantially at the same level. This eliminates the level difference between the in-screen frame region and the in-screen display region due to the presence of the light-blocking layer provided in the in-screen frame region. As a result, occurrence of color irregularities near the boundary between the in-screen display region and the in-screen frame region is suppressed.

In the color filter substrate according to the present invention, the light-blocking layer may be thicker than the color filter layer, and the height of the first spacer part may be smaller than that of the second spacer part.

With this structure, if the light-blocking layer in the in-screen frame region is thicker than the color filter layer in the in-screen display region, the height of the first spacer part in the in-screen frame region is smaller than that of the second spacer part in the in-screen display region, so that the sum of the height of the first spacer part and the thickness of the light-blocking layer is substantially equal to the sum of the height of the second spacer part and the thickness of the color filter layer. Accordingly, the upper edge of the first spacer part in the in-screen frame region and the upper edge of the second spacer part in the in-screen display region are substantially at the same level.

In the color filter substrate according to the present invention, a black matrix for preventing light from reaching portions between the colored layers may be provided between the colored layers in the color filter layer.

In the color filter substrate according to the present invention, the second spacer part may be located in such a manner that the black matrix overlays the second spacer, and the sum of the height of the first spacer part and the thickness of the light-blocking layer may be substantially equal to the sum of the height of the second spacer part and the thickness of the black matrix.

In this structure, the black matrix formed between the plurality of colored layers in the color filter layer overlays the second spacer part in the in-screen display region. Accordingly, even if scattering or transmission of light is caused by the second spacer part display quality in the screen is not degraded. In addition, the sum of the height of the first spacer part and the thickness of the light-blocking layer is substantially equal to the sum of the height of the second spacer part and the thickness of the black matrix, so that the upper edge of the first spacer part in the in-screen frame region and the upper edge of the second spacer part in the in-screen display region are substantially at the same level. This eliminates the level difference between the in-screen frame region and the in-screen display region due to the presence of the light-blocking layer provided in the in-screen frame region. As a result, occurrence of color irregularities near the boundary between the in-screen display region and the in-screen frame region is suppressed.

In the color filter substrate according to the present invention, the light-blocking layer may be thicker than the black matrix, and the height of the first spacer part may be smaller than that of the second spacer part.

In this structure, if the light-blocking layer in the in-screen frame region is thicker than the black matrix in the in-screen display region, the height of the first spacer part in the in-screen frame region is smaller than that of the second spacer part in the in-screen display region, so that the sum of the height of the first spacer part and the thickness of the light-blocking layer is substantially equal to the sum of the height of the second spacer part and the thickness of the black matrix. Accordingly, the upper edge of the first spacer part in the in-screen frame region and the upper edge of the second spacer part in the in-screen display region are substantially at the same level.

In the color filter substrate according to the present invention, colored layers associated with red, green and blue, respectively, may be arranged in the color filter layer, and the light-blocking layer may be formed by stacking materials constituting the colored layers associated with red and blue, respectively, in the color filter layer.

In this structure, the light-blocking layer in the in-screen frame region is formed by stacking materials constituting the red and blue colored layers in the color filter layer. That is, the light-blocking layer is formed by the same process as that for the red and blue colored layers in the color filter layer, so that the process of fabricating the color filter substrate is simplified. In addition, out of red, green and blue colored layers, the combination of the red and blue colored layers exhibits the lowest light transmittance, so that the light-blocking layer having a sufficient light-blocking property is formed by utilizing formation of the colored filter layer.

In the color filter substrate according to the present invention, the second spacer part may be formed by stacking a material constituting the first spacer part and a material constituting at least one of the colored layers in the color filter layer.

In this structure, the second spacer part in the in-screen display region is formed by stacking the material constituting the first spacer part in the in-screen frame region and the material constituting at least one of the colored layers in the in-screen display region. Accordingly, the height of the second spacer part is larger than that of the first spacer part by the thickness of the colored layer, so that the upper edge of the first spacer part in the in-screen frame region and the upper edge of the second spacer part in the in-screen display region are at the same level.

In the color filter substrate according to the present invention, liquid crystal molecules may be oriented with respect to a side of the transparent substrate toward the color filter layer, and the in-screen display region may include a projection made of a material constituting the first and second spacer parts and used for controlling orientation of the liquid crystal molecules.

In this structure, a projection made of the material constituting the first and second spacer part is provided in the in-screen display region, so that orientation of liquid crystal molecules is controlled by utilizing this projection.

In the color filter substrate according to the present invention, the color filter layer, the light-blocking layer and the first and second spacer parts may be formed by dry-film laminating processes in each of which a resin film formed on a film is transferred to the transparent substrate.

In this structure, the color filter layer, the light-blocking layer and the first and second spacer parts are formed by dry-laminating processes, so that the thicknesses thereof are controlled with higher accuracy than in the case of forming these films by conventional spin coating. Accordingly, the levels of the upper edges, i.e., the heights, of the first spacer part in the in-screen frame region and the second spacer part in the in-screen display region are controlled with accuracy.

The color filter substrate as described above exhibits its advantages especially in a display apparatus.

A display apparatus according to the present invention includes: a color filter substrate including a transparent substrate and a color filter layer, the color filter layer being provided on the transparent substrate and made of a plurality of colored layers; an element substrate being opposed to the color filter substrate and including a transparent substrate and a plurality of switching elements provided on the transparent substrate; and a display medium layer sandwiched and held between the color filter substrate and the element substrate, wherein an in-screen display region associated with the color filter layer and an in-screen frame region located around the in-screen display region are defined in each of the color filter substrate and the element substrate, a light-blocking layer is provided in the in-screen frame region of the element substrate to cover the transparent substrate of the element substrate, the element substrate has a surface level difference resulting from the presence of the light-blocking layer, between the in-screen frame region and the in-screen display region, a first spacer part and a second spacer part are formed in the in-screen frame region and the in-screen display region, respectively, of the color filter substrate to define the thickness of the display medium layer, and a height difference between the first spacer part and the second spacer part is substantially equal to the surface level difference between the in-screen frame region and the in-screen display region.

In this structure, the light-blocking layer is provided in the in-screen frame region of the element substrate, and the first and second spacer parts are formed in the in-screen frame region and the in-screen display region, respectively, of the color filter substrate so as to define the thickness of the display medium layer. In addition, the height difference between the first spacer part and the second spacer part is substantially the same as the surface level difference between the in-screen frame region and the in-screen display region. Accordingly, the height difference between the first spacer part formed in the in-screen frame region and the second spacer part formed in the in-screen display region eliminates the surface level difference between the in-screen frame region and the in-screen display region of the element substrate. As a result, occurrence of color irregularities near the boundary between the in-screen display region and the in-screen frame region is suppressed.

In the display apparatus according to the present invention, the surface of the in-screen frame region of the element substrate may be at a level higher than that of the in-screen display region of the element substrate, and the height of the first spacer part may be smaller than that of the second spacer part.

With this structure, if the surface of the in-screen frame region of the element substrate is at a level higher than that of the in-screen display region of the element substrate because of the presence of the light-blocking layer in the in-screen frame region of the element substrate, the height of the first spacer part formed in the in-screen frame region is smaller than the second spacer part formed in the in-screen display region. This eliminates the surface level difference between the in-screen frame region and the in-screen display region of the element substrate.

In the display apparatus according to the present invention, the second spacer part may be formed by stacking a material constituting the first spacer part and a material constituting at least one of the colored layers in the color filter layer.

In this structure, the second spacer part in the in-screen display region is formed by stacking the material constituting the first spacer part in the in-screen frame region and the material constituting at least one of the colored layers in the in-screen display region. Accordingly, the height of the second spacer part is larger than that of the first spacer part by the thickness of the colored layer, so that the surface level difference between the in-screen frame region and the in-screen display region of the element substrate is eliminated.

In the display apparatus according to the present invention, the display medium layer may contain liquid crystal molecules, and the in-screen display region of the color filter substrate may include a projection made of a material constituting the first and second spacer parts and used for controlling orientation of the liquid crystal molecules.

In this structure, a projection made of the material constituting the first and second spacer parts is provided in the in-screen display region, so that orientation of liquid crystal molecules is controlled by utilizing this projection.

In the display apparatus according to the present invention, the color filter layer, the light-blocking layer and the first and second spacer parts are formed by dry-film laminating processes in each of which a resin film formed on a film is transferred to the transparent substrate.

In this structure, the color filter layer, the light-blocking layer and the first and second spacer parts are formed by dry-laminating processes, so that the thicknesses thereof are controlled with higher accuracy than in the case of forming these films by conventional spin coating. Accordingly, the levels of the upper edges, i.e., the heights, of the first spacer part in the in-screen frame region and the second spacer part in the in-screen display region are controlled with accuracy.

DESCRIPTION OF THE PREFERRED EMBODIMENTS

Hereinafter, embodiments of the present invention will be specifically described with reference to the accompanying drawings. In the following embodiments, liquid crystal display apparatuses using TFTs as switching elements will be used as examples of display apparatuses. The present invention is not limited to the following embodiments and may have other configurations.

Embodiment 1

Hereinafter, a liquid crystal display apparatus according to a first embodiment of the present invention will be described.

Figure 1:
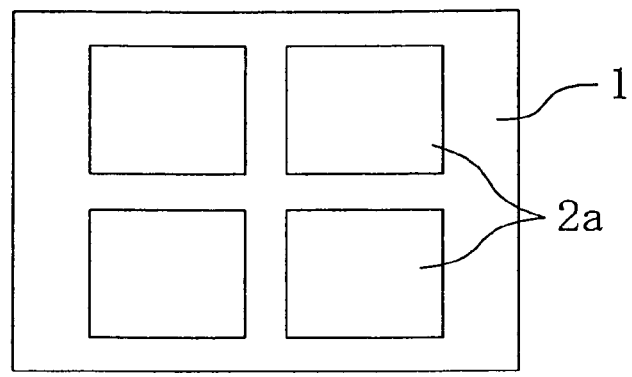
FIG. 1 is a schematic plan view showing a configuration in which a plurality of color filter substrates constituting a liquid crystal panel according to a first embodiment of the present invention are arranged on a mother glass.
Figure 2:
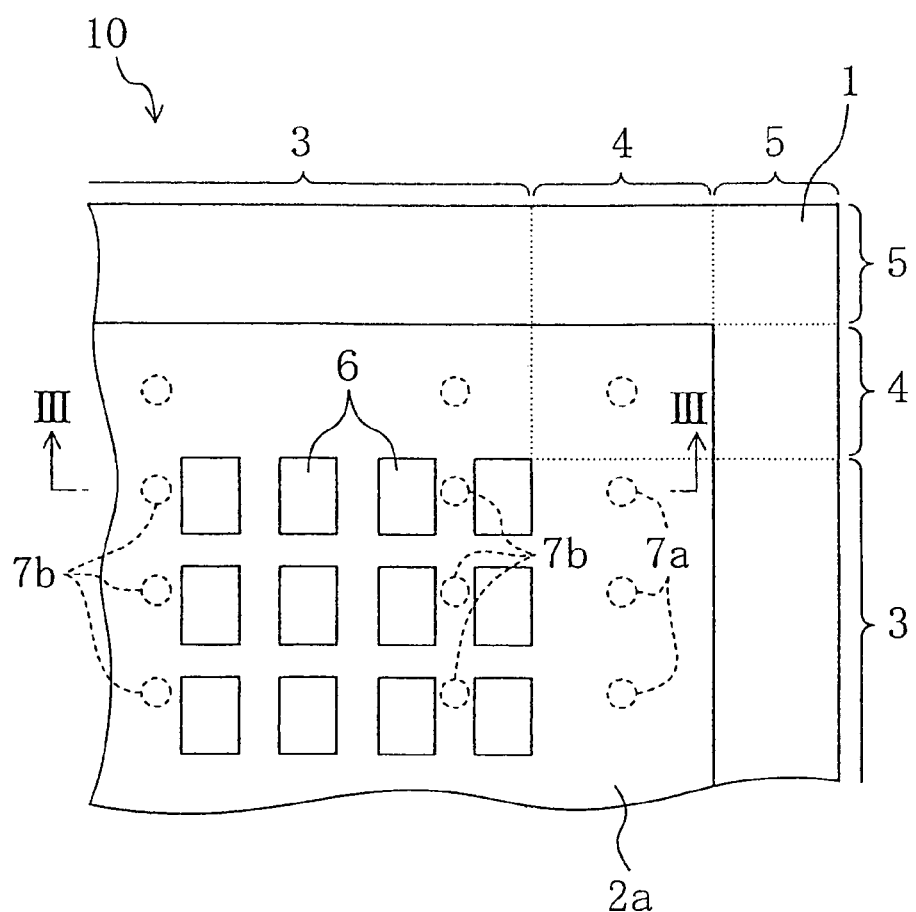
FIG. 2 is a schematic plan view showing the liquid crystal panel.
Figure 3:
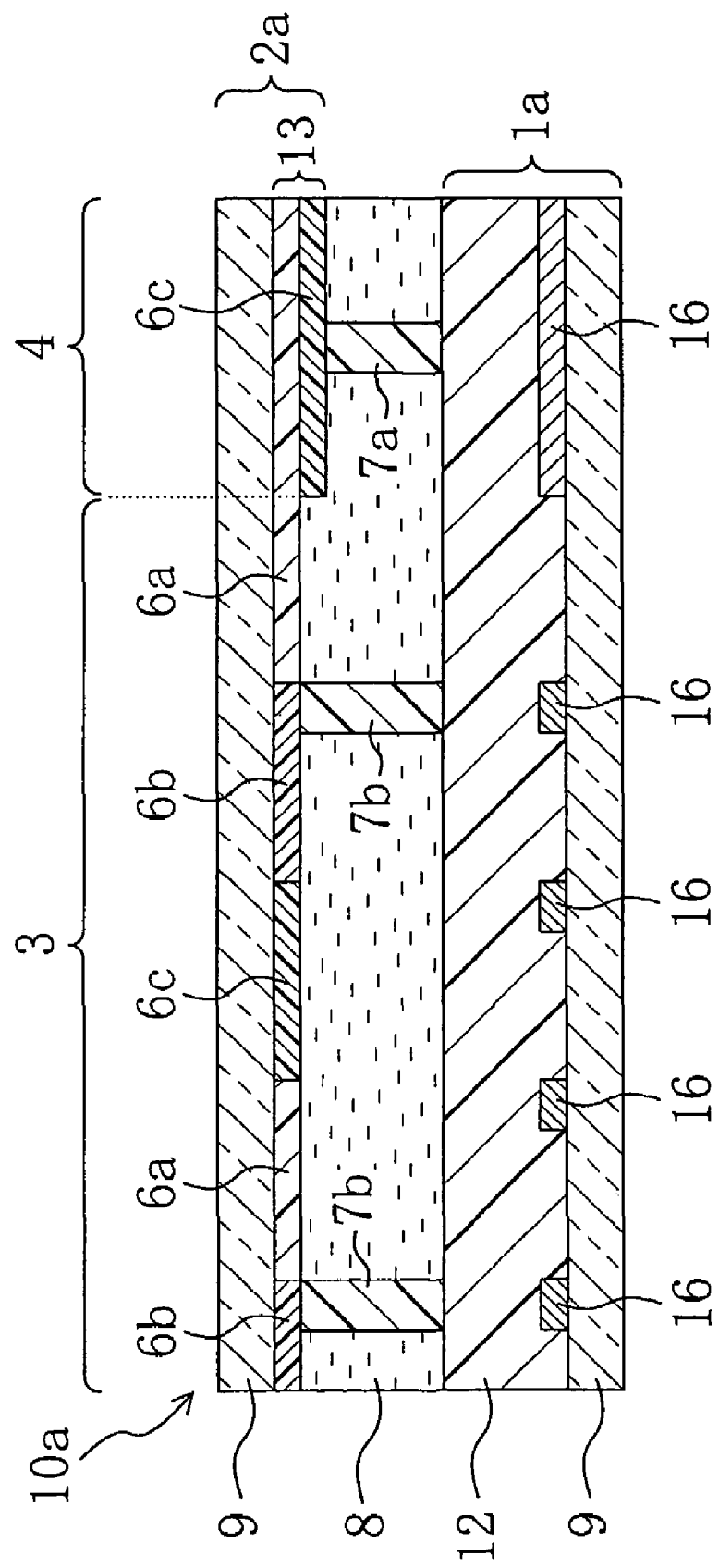
FIG. 3 is a schematic cross-sectional view showing the liquid crystal panel of the first embodiment.
Figure 4:
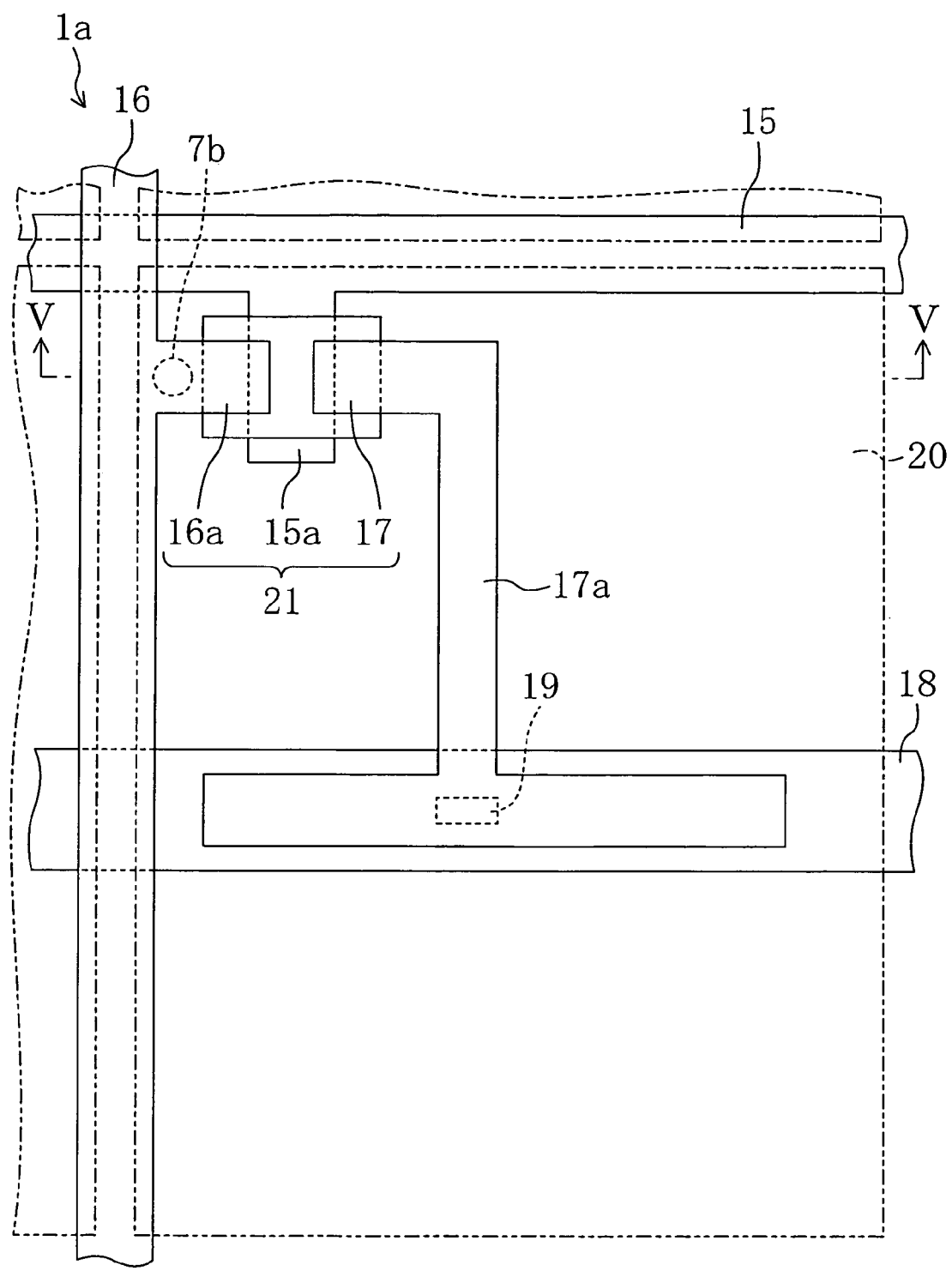
FIG. 4 is a schematic plan view showing an active matrix substrate 1a constituting the liquid crystal panel of the first embodiment.
Figure 5:
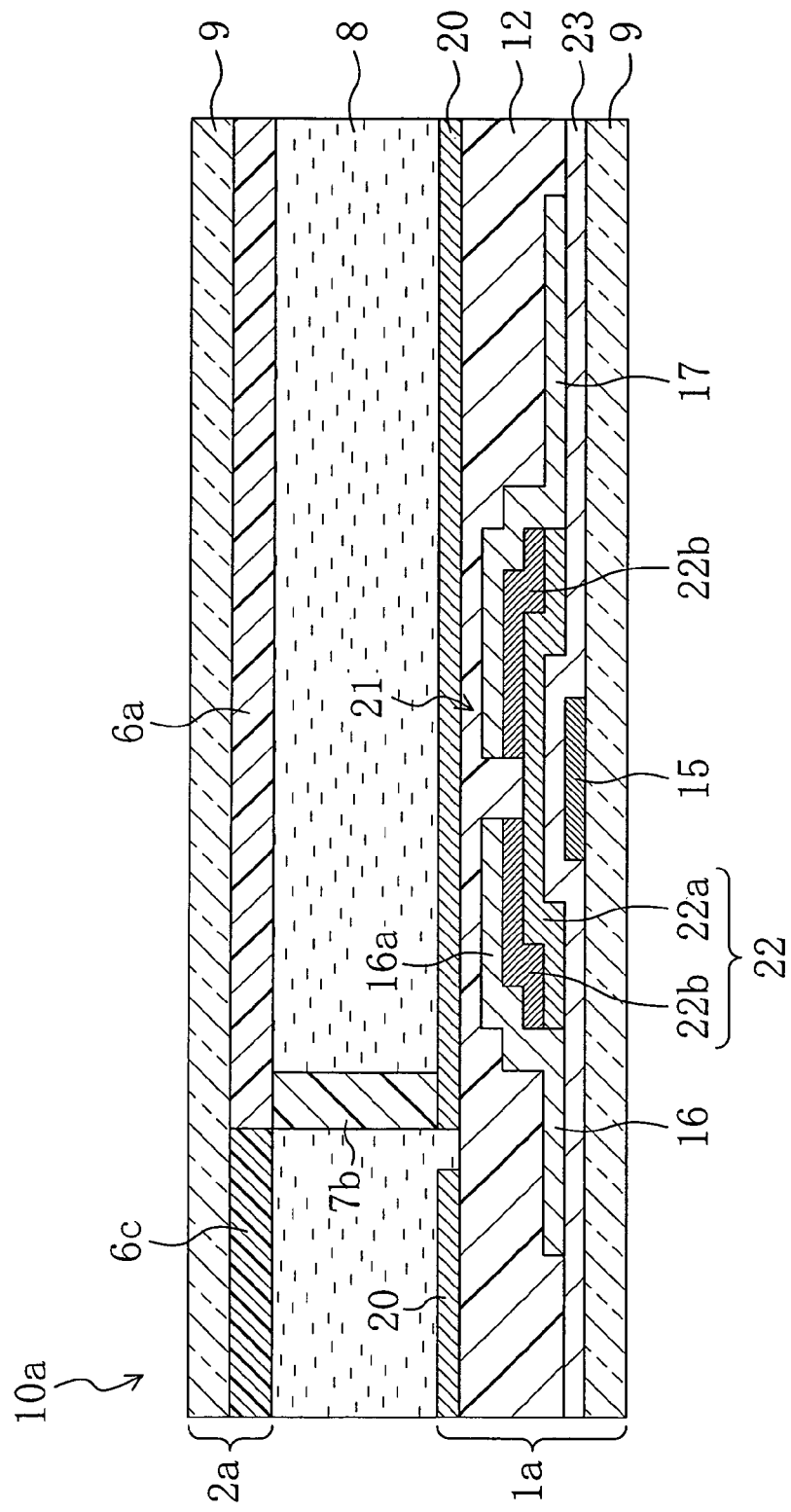
FIG. 5 is a schematic cross-sectional view showing the liquid crystal panel of the first embodiment taken along the line V-V in FIG. 4.

FIG. 1 is a schematic plan view showing a configuration in which a plurality of color filter substrates 2a constituting a liquid crystal panel 10 are arranged on a mother glass 1. FIG. 2 is a schematic plan view showing a peripheral part of the liquid crystal panel 10 in an enlarged manner. FIG. 3 is a schematic cross-sectional view of the liquid crystal panel. FIG. 4 is a schematic plan view showing a pixel part of the liquid crystal panel. FIG. 5 is a schematic cross-sectional view taken along the line V-V in FIG. 4. In FIG. 3, the configuration on an active matrix substrate 1a is shown in a simplified manner.

During fabrication of a liquid crystal display apparatus, a plurality of color filter substrates 2a are arranged in a matrix pattern on the mother glass 1, and each of the color filter substrates 2a form a panel region, thereby constituting a liquid crystal panel 10a.

The liquid crystal panel 10a includes: the active matrix substrate 1a functioning as an element substrate; the color filter substrates 2a opposed to the active matrix substrate 1a; and a liquid crystal layer 8 sandwiched and held between these substrates 1a and 2a and forming a display medium layer.

In the active matrix substrate 1a, a plurality of gate lines 15 and a plurality of source lines 16 are arranged on an insulating transparent substrate 9 to be orthogonal to each other. Between each two of the gate lines 15, a capacitor line 18 extends in parallel with the gate lines 15. A TFT 21 is provided as a switching element at each intersection between the gate lines 15 and the source lines 16. A pixel electrode 20 constituting a pixel and associated with the TFT 21 is provided in each display region enclosed with a pair of the gate lines 15 and a pair of the source lines 16.

The active matrix substrate 1a has a multilayer structure in which a gate insulating film 23 and an interlayer insulating film 12 are stacked in this order over the insulating transparent substrate 9.

Between the insulating transparent substrate 9 and the gate insulating film 23, the gate lines 15, gate electrodes 15a projecting from the gate lines 15 in the direction along the source lines 16, the capacitor lines 18 and extended gate lines 11 as extensions of the respective gate lines 15 are provided.

Between the gate insulating film 23 and the interlayer insulating film 12, a semiconductor layer 22 including an intrinsic amorphous silicon layer 22a and an n$^+$ amorphous silicon layer 22b stacked in this order to constitute the TFTs 21 is provided, and the source lines 16 and source electrodes 16a associated with the respective TFTs 21 and projecting from the source lines 16 along the direction of the gate lines 15, drain electrodes 17 opposed to the respective source electrodes 16a and extended drain electrodes 17a as extensions of the respective drain electrodes 17 are provided on the semiconductor layer 22.

The pixel electrodes 20 are provided on the interlayer insulating film 12 and are connected to the extended drain electrodes 17a via contact holes 19. An alignment film (not shown) is provided on the pixel electrodes 20.

Parts of the extended drain electrodes 17a located on the capacitor lines 18 serve as auxiliary capacitor electrodes and constitute auxiliary capacitors together with the associated capacitor lines 18 via the gate insulating film 23.

Each of the color filter substrates 2a has a multilayer structure in which a color filter layer 6 and a common electrode (not shown) are stacked in this order over the insulating transparent substrate 9.

Spacers oriented substantially perpendicularly to the insulating transparent substrate 9 are provided on the common electrode to define the thickness of the liquid crystal layer 8 sandwiched and held between the active matrix substrate 1a and the color filter substrates 2a.

A red layer 6a, a green layer 6b and a blue layer 6c are provided in the color filter layer 6 and each pixel of the active matrix substrate 1a is associated with one of these colored layers. A light-blocking layer 13 that is a stack of the red layer 6a and the blue layer 6c and is thicker than the color filter layer 6 is provided in the periphery of the color filter layer 6 (i.e., in an in-screen frame region 4 that will be described later.)

This light-blocking layer 13 is located in the in-screen frame region 4 and thus has no direct relation with image display, but blocks light from a backlight or the like necessary for image display in an in-screen display region.

The liquid crystal layer 8 is made of a nematic liquid crystal material having an electro-optic property.

In this liquid crystal panel 10a, a region where a plurality of pixels are arranged in a matrix pattern, i.e., a region where the color filter layers 6 of the color filter substrates 2a are arranged in a matrix pattern, is defined as an in-screen display region 3. A region located around the in-screen display region 3 and including the color filter substrates 2a is defined as the in-screen frame region 4. A region including no color filter substrates 2a and including only the active matrix substrate 1a is defined as an out-of-screen region.

The liquid crystal panel 10a is mounted on a casing or a frame having an opening such that the in-screen display region 3 and the in-screen frame region 4 are located in the opening and in a portion surrounding the opening, respectively, thereby constituting a liquid crystal display apparatus.

The spacers for the color filter substrates 2a include first spacer parts 7a provided in the in-screen frame region 4 and second spacer parts 7b each provided between pixels in the in-screen display region 3. The height of the first spacer parts 7a is adjusted to be smaller than that of the second spacer parts 7b such that the sum of the height of the first spacer parts 7a and the thickness of the light-blocking layer 13 is substantially equal to the sum of the height of the second spacer parts 7b and the thickness of the color filter layer 6.

The expression herein that the sum of the height of the first spacer parts 7a and the thickness of the light-blocking layer 13 is substantially equal to the sum of the height of the second spacer parts 7b and the thickness of the color filter layer 6 means that the difference between these sums is 0.1 µm or less. If the difference between the sums is 0.1 µm or less in this way, variation of a color tone due to retardation is hardly perceived.

In this manner, the upper edge of the first spacer parts 7a in the in-screen frame region 4 and the upper edge of the second spacer parts 7b in the in-screen display region 3 are substantially at the same level. Accordingly, the level difference occurring between the in-screen frame region 4 and the in-screen display region 3 because of the presence of the light-blocking layer 13 provided in the in-screen frame region 4 of each of the color filter substrates 2a is eliminated, so that occurrence of color irregularities near the boundary between the in-screen display region 3 and the in-screen frame region 4 is suppressed.

The liquid crystal panel 10a is configured in the following manner. One pixel is provided for each of the pixel electrodes 20. In the pixel, when a gate signal is sent from one of the gate lines 15 (the extended gate lines 11) to turn the TFT 21 ON, a source signal is sent via the source electrode 16a and the drain electrode 17 (the extended drain electrode 17a) so that given charge is written in the pixel electrode 20 and a potential difference occurs between the pixel electrode 20 and the common electrode of the color filter substrate 2a. Accordingly, a given voltage is applied to liquid crystal capacitor of the liquid crystal layer 8 and the auxiliary capacitor. The liquid crystal panel 10a displays an image while adjusting the transmittance of light incident from a backlight or the like by utilizing a change of orientation state of liquid crystal molecules depending on the level of the applied voltage.

In this embodiment, TFTs made of amorphous silicon are used as switching elements. Alternatively, TFTs made of microcrystal silicon, polysilicon or continuous grain silicon (CGS) or two-terminal switching elements with, for example, metal insulator metals (MIM) structures.

Now, a method for fabricating a liquid crystal panel 10a according to the first embodiment of the present invention will be described.

<Process of Fabricating Active Matrix Substrate>

Hereinafter, a process of fabricating an active matrix substrate according to the first embodiment of the present invention will be described with reference to the schematic plan view of FIG. 4 and the schematic cross-sectional view of FIG. 5.

First, a metal film (with a thickness of about 200 nm) made of aluminum (Al) is deposited by a sputtering process over the entire substrate, i.e., over the surface of an insulating transparent substrate 9 made of, for example, glass. Thereafter, patterning is performed by a photo engraving process (hereinafter, referred to as a PEP), thereby forming gate lines 15, gate electrodes 15a, capacitor lines 18 and extended gate lines 11.

Next, a silicon nitride film (with a thickness of about 400 nm), for example, is deposited by a chemical vapor deposition (CVD) process over the entire surface of the substrate including the gate lines 15, the gate electrodes 15a, the capacitor lines 18 and the extended gate lines 11, thereby forming a gate insulating film 23.

Then, over the entire substrate, i.e., over the surface of the gate insulating film 23, an intrinsic amorphous silicon film (with a thickness of about 150 nm) and an $n^+$ amorphous silicon film (with a thickness of about 50 nm) doped with phosphorus are successively formed by CVD processes. Subsequently, these films are patterned by a PEP into the shape of islands on the gate electrodes 15a, thereby forming a semiconductor layer 22 made of an intrinsic amorphous silicon layer 22a and an $n^+$ amorphous silicon layer 22b.

Thereafter, a metal film (with a thickness of about 200 nm) made of aluminum (Al) is deposited by a sputtering process over the entire substrate, i.e., over the surface of the gate insulating film 23 on which the semiconductor layer 22 has been formed. Then, the film is patterned by a PEP, thereby forming source lines 16, source electrodes 16a, drain electrodes 17 and extended drain electrodes 17a.

In this embodiment, the gate lines 15 and the source lines 16 are made of aluminum (Al), as an example. However, the gate lines 15 and the source lines 16 only need to be made of metal films having desired electric resistances. For example, a metal such as tantalum (Ta), titanium (Ti) or chromium (Cr) or an alloy containing these metals or a multilayer film as a stack of TaN (tantalum nitride)/Ta/TaN or Ti/Al/Ti, for example, may be used. Moreover, the source lines 16 is not necessarily made of a general metal film and may also be made of a transparent conductive film of indium tin oxide (ITO) or other materials, for example.

Then, part of the $n^+$ amorphous silicon layer 22b in the semiconductor layer 22 is removed by etching using the source electrodes 16a and the drain electrodes 17 as a mask, thereby forming channels.

Subsequently, the entire substrate including the source lines 16, the source electrodes 16a, the drain electrodes 17 and the extended drain electrodes 17a is coated with an acrylic positive photosensitive transparent resin with a thickness of about 2.5 µm, thereby forming an interlayer insulating film 12.

Then, parts of the interlayer insulating film 12 associated with the extended drain electrodes 17a are removed by etching, thereby forming contact holes 19.

Thereafter, a transparent conductive film (with a thickness of about 10 nm) made of an ITO film is deposited by a sputtering process over the entire substrate, i.e., over the surface of the interlayer insulating film 12. Subsequently, the film is patterned by a PEP, thereby forming pixel electrodes 20. Instead of the ITO film, a transparent conductive film such as an indium zinc oxide (IZO) film may be used as long as this film has a desired electric resistance value.

Then, a polyimide resin is applied onto the entire substrate including the pixel electrodes 20 to a thickness of about 100 nm, thereby forming an alignment film.

In this manner, an active matrix substrate 1a is fabricated.

<Process of Fabricating Color Filter Substrate>

Hereinafter, a process of fabricating a color filter substrate according to the first embodiment of the present invention will be described with reference to the schematic plan view of FIG. 2 and the schematic cross-sectional view of FIG. 3.

Before the process, dry films in each of which a resin film made of a photosensitive resin (negative type) containing dispersed pigments of red, green or blue is sandwiched and held between release films such as polyethylene terephthalate (PET) films are prepared.

First, one of release films at one side of a red dry film is peeled off, the red dry film is bonded onto the insulating transparent substrate 9 with the face thereof from which the release film has been peeled off pressed against the insulating transparent substrate 9, and then the other release film is peeled off. In this manner, a red photosensitive resin film is transferred to the insulating transparent substrate 9. This process is a so-called thermal transfer process that is generally performed with a dry film heated. A method of transferring a resin film onto a substrate is called a dry-film laminating method.

Next, the transferred red photosensitive resin film is exposed to light using a photomask and developed for pattern formation, thereby forming a red layer 6a. The red layer 6a is formed in a part of the in-screen display region 3 associated with given pixels and the entire region of the in-screen frame region 4.

Then, with respect to green, the same process as that for red is repeated, thereby forming a green layer 6b in a part of the in-screen display region 3 associated with given pixels.

Thereafter, with respect to blue, the same process as those for red and green is repeated, thereby forming a blue layer 6c in a part of the in-screen display region 3 associated with given pixels and the entire region of the in-screen frame region 4. In this manner, a light-blocking layer 13 as a stack of the red layer 6a and the blue layer 6c is formed in the entire region of the in-screen frame region 4. That is, the light-blocking layer 13 is formed in the same process as those for the red layer 6a and the blue layer 6c in the color filter layer 6, so that the process of fabricating (forming) a color filter substrate 2a is simplified. Out of the red, green and blue colored layers, the combination of the red and blue colored layers exhibits the lowest light transmittance, so that the light-blocking layer 13 has a sufficient light-blocking property by utilizing formation of the color filter layer 6.

In the manner described above, the color filter layer 6 made of the red layer 6a, the green layer 6b and the blue layer 6c and the light-blocking layer 13 are formed. The order of forming the red, green and blue colored layers is not limited to the above order.

Then, a transparent conductive film (with a thickness of about 10 nm) such as an ITO film is deposited by a sputtering process over the entire substrate, i.e., over the color filter layer 6. Subsequently, the film is patterned by a PEP, thereby forming a common electrode. Instead of the ITO film, a transparent conductive film such as an indium zinc oxide (IZO) film may be used as long as this film has a desired electric resistance value.

Thereafter, a photosensitive resin film is transferred to the entire substrate including the common electrode by a dry-film laminating process.

Then, the transferred photosensitive resin film is exposed to light using a photomask and developed for pattern formation, thereby forming spacers including first spacer parts 7a and second spacer parts 7b. At this time, exposure time for the in-screen frame region 4 is set shorter than that for the in-screen display region 3, so that the second spacer parts 7b are formed in the in-screen display region 3 and the first spacer parts 7a having a height smaller than the second spacer parts 7b are formed and the in-screen frame region 4.

In this manner, the color filter layer 6, the light-blocking layer 13, the first spacer parts 7a and the second spacer parts 7b are formed by dry-film laminating processes, so that the thicknesses thereof are controlled with higher accuracy than in the case of forming these films by conventional spin coating. Accordingly, the levels of the upper edges, i.e., the heights, of the first spacer parts 7a in the in-screen frame region 4 and the second spacer parts 7b in the in-screen display region 3 are controlled with accuracy. In a case where the accuracy in controlling the heights of the spacers does not need to be considered strictly, the color filter layer 6, the light-blocking layer 13, the first spacer parts 7a and the second spacer parts 7b may be formed not only by dry-film laminating processes but also by spin coating processes or die coating processes.

Then, a polyimide resin is applied onto the entire substrate including the common electrode, thereby forming an alignment film.

In this manner, a color filter substrate 2a is fabricated.

<Process of Fabricating Liquid Crystal Panel>

Hereinafter, a process of fabricating a liquid crystal panel according to the first embodiment of the present invention will be described.

First, a seal material such as a thermosetting epoxy resin is applied onto the active matrix substrate 1a or the color filter substrates 2a by screen printing into a frame pattern lacking in a portion corresponding to a liquid-crystal inlet.

Next, the active matrix substrate 1a and the color filter substrates 2a are bonded together, the seal material is cured, and then the bonded substrates are divided into liquid crystal panel units, thereby forming empty cells.

Then, a liquid crystal material is injected by a low-pressure process into a gap between the active matrix substrate 1a and the color filter substrates 2a in each of the empty cells, thereby forming a liquid crystal layer 8. Thereafter, an UV-setting resin is applied to the liquid-crystal inlet and the UV-setting resin is cured with UV irradiation, thereby sealing the inlet.

In this manner, a liquid crystal panel 10a according to the present invention is fabricated.

As described above, in the inventive liquid crystal display apparatus of the liquid crystal panel 10a, the first spacer parts 7a and the second spacer parts 7b are formed approximately perpendicular to the insulating transparent substrate 9 in the in-screen frame region 4 and the in-screen display region 3, respectively, of each of the color filter substrates 2a. In addition, the height of the first spacer parts 7a is adjusted to be smaller than that of the second spacer parts 7b by the thickness of the blue layer 6c in such a manner that the sum of the height of the first spacer parts 7a and the thickness of the light-blocking layer 13 as a stack of the red layer 6a and the blue layer 6c is equal to the sum of the height of the second spacer parts 7b and the thickness of the color filter layer 6. Accordingly, the upper edge of the first spacer parts 7a in the in-screen frame region 4 and the upper edge of the second spacer parts 7b in the in-screen display region 3 are substantially at the same level. This eliminates the level difference between the in-screen frame region 4 and the in-screen display region 3 due to the presence of the light-blocking layer 13 provided in the in-screen frame region 4 of each of the color filter substrates 2a. As a result, occurrence of color irregularities near the boundary between the in-screen display region 3 and the in-screen frame region 4 is suppressed.

Embodiment 2

Hereinafter, a liquid crystal display apparatus according to a second embodiment of the present invention will be described.

Figure 6:
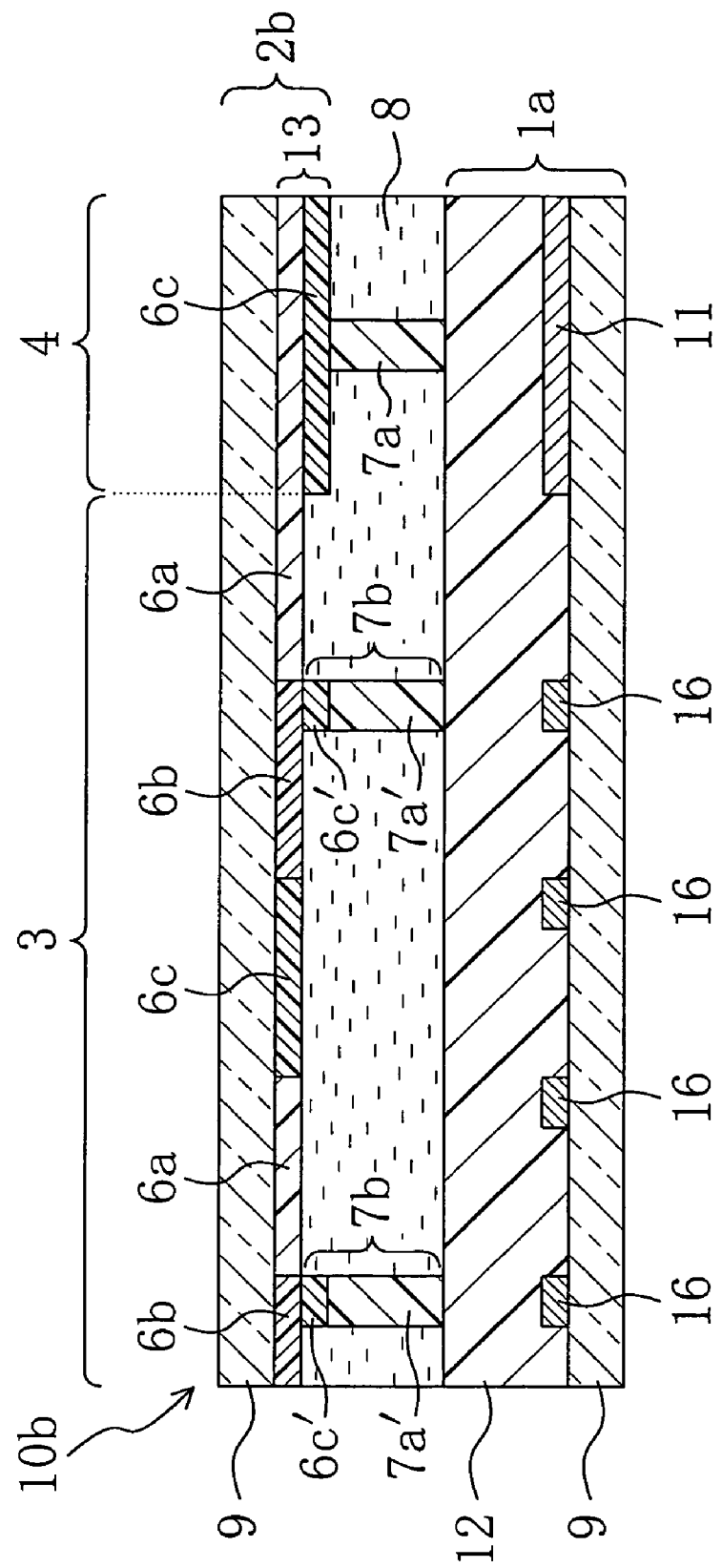
FIG. 6 is a schematic cross-sectional view showing a liquid crystal panel according to a second embodiment of the present invention and corresponds to the schematic cross-sectional view of FIG. 3.

FIG. 6 is a schematic cross-sectional view showing a liquid crystal panel 10b. This cross-sectional view corresponds to the schematic cross-sectional view of FIG. 3. As in FIG. 3, an active matrix substrate 1a shown in FIG. 6 is simplified in its structure on a substrate.

The liquid crystal panel 10b includes: the active matrix substrate 1a functioning as an element substrate; color filter substrates 2b opposed to the active matrix substrate 1a; and a liquid crystal layer 8 sandwiched and held between these substrates 1a and 2b and forming a display medium layer.

The active matrix substrate 1a and the liquid crystal layer 8 are substantially the same as those described in the first embodiment, and detailed description thereof will be omitted.

The color filter substrates 2b are the same as the color filter substrates 2a of the first embodiment in structure except for the structure of second spacer parts 7b. Hereinafter, the structure of the second spacer parts 7b will be mainly described.

The second spacer parts 7b are constituted by second-spacer lower layer portions 6c' and second-spacer upper layer portions 7a' and are provided on a color filter layer 6. The second-spacer lower layer portions 6c' are made of a colored layer of a color different from that of a colored layer on which the layer is formed. In the case of FIG. 6, the second spacer parts 7b are formed on a green layer 6b, so that the second-spacer lower layer portions 6c' are made of a blue layer 6c.

The height of the second spacer parts 7b is adjusted to be larger than that of the first spacer parts 7a by the thickness of the second-spacer lower layer portions 6c'. The sum of the height of the first spacer parts 7a and the thickness of a light-blocking layer 13 as a stack of a red layer 6a and the blue layer 6c is substantially equal to the sum of the height of the second spacer parts 7b as a stack of the second-spacer upper layer portions 7a' and the second-spacer lower layer portions 6c' and the thickness of the color filter layer 6.

As in the first embodiment, the expression, "substantially equal" means that the difference between the sums is 0.1 µm or less. If the difference is 0.1 µm or less in this way, variation of a color tone due to retardation is hardly perceived.

A method for fabricating the liquid crystal panel 10b of the second embodiment of the present invention is substantially the same as that in the first embodiment. Therefore, only a method for fabricating the color filter substrates 2b, which is a feature of the second embodiment, will be described.

<Process of Fabricating Color Filter Substrate>

Hereinafter, a process of fabricating a color filter substrate according to the second embodiment of the present invention will be described with reference to the schematic cross-sectional view of FIG. 6.

As in the first embodiment, before the process, dry films in each of which a resin film made of a photosensitive resin (negative type) containing dispersed pigments of red, green or blue is sandwiched and held between release films such as polyethylene terephthalate (PET) films are prepared.

First, one of release films at one side of a red dry film is peeled off, the red dry film is bonded onto an insulating transparent substrate 9 with the face thereof from which the release film has been peeled off pressed against the insulating transparent substrate 9, and then the other release film is peeled off. In this manner, a red photosensitive resin film is transferred to the insulating transparent substrate 9.

Next, the transferred red photosensitive resin film is exposed to light using a photomask and developed for pattern formation, thereby forming a red layer 6a. The red layer 6a is formed in a part of an in-screen display region 3 associated with given pixels and the entire region of an in-screen frame region 4.

Then, with respect to green, the same process as that for red is repeated, thereby forming a green layer 6b in a part of the in-screen display region 3 associated with given pixels.

Thereafter, with respect to blue, the same process as those for red and green is repeated, thereby forming a blue layer 6c in a part of the in-screen display region 3 associated with given pixels, a part of the in-screen display region 3 associated with the green layer 6b and the entire region of the in-screen frame region 4. In this manner, a light-blocking layer 13 as a stack of the red layer 6a and the blue layer 6c is formed in the entire region of the in-screen frame region 4. A color filter layer 6 made of the red layer 6a, the green layer 6b and the blue layer 6c is formed in the in-screen display region 3. Second-spacer lower layer portions 6c' are formed on the green layer 6b.

Then, a transparent conductive film (with a thickness of about 10 nm) such as an ITO film is deposited by a sputtering process over the entire substrate, i.e., over the color filter layer 6. Subsequently, the film is patterned by a PEP, thereby forming a common electrode. Instead of the ITO film, a transparent conductive film such as an indium zinc oxide (IZO) film may be used as long as this film has a desired electric resistance value.

Thereafter, a photosensitive resin film is transferred to the entire substrate including the common electrode, by a dry-film laminating process.

Then, the transferred photosensitive resin film is exposed to light using a photomask and developed for pattern formation, thereby forming first spacer parts 7a and second-spacer upper layer portions 7a' in the in-screen frame region 4 and the in-screen display region 3, respectively.

At this time, exposure times in the formations of the first spacer parts 7a and the second-spacer upper layer portions 7a' are the same, so that the heights of the first spacer parts 7a and the second-spacer upper layer portions 7a' are also the same. Since the second spacer parts 7b are made of a film as a stack of the second-spacer lower layer portions 6c' and the second-spacer upper layer portions 7a', the height of the second spacer parts 7b is larger than that of the first spacer parts 7a by the thickness of the second-spacer lower layer portions 6c'. Accordingly, the upper edge of the first spacer parts 7a in the in-screen frame region 4 and the upper edge of the second spacer parts 7b in the in-screen display region 3 are substantially at the same level.

The order of forming the red, green and blue colored layers is not limited to the above order.

Then, a polyimide resin is applied onto the entire substrate including the common electrode, thereby forming an alignment film.

In this manner, a color filter substrate 2b is fabricated.

As described above, in the color filter substrates 2b according to the present invention and the liquid crystal panel 10b including the color filter substrates 2b, the first spacer parts 7a and the second spacer parts 7b made of the second-spacer upper layer portions 7a' and the second-spacer lower layer portions 6c' are formed in the in-screen frame region 4 and the in-screen display region 3, respectively, of each of the color filter substrates 2b to be oriented substantially perpendicularly to the insulating transparent substrate 9. In addition, the height of the first spacer parts 7a is adjusted to be smaller than that of the second spacer parts 7b by the thickness of the blue layer 6c in such a manner that the sum of the height of the first spacer parts 7a and the thickness of the light-blocking layer 13 as a stack of the red layer 6a and the blue layer 6c is substantially equal to the sum of the height of the second spacer parts 7b as a stack of the upper layer portions 7a' and the lower layer portions 6c' and the thickness of the color filter layer 6. Accordingly, the upper edge of the first spacer parts 7a in the in-screen frame region 4 and the upper edge of the second spacer parts 7b in the in-screen display region 3 are substantially at the same level. In this manner, the level difference occurring between the in-screen frame region 4 and the in-screen display region 3 due to the presence of the light-blocking layer 13 provided in the in-screen frame region 4 of each of the color filter substrates 2b is eliminated, so that occurrence of color irregularities near the boundary between the in-screen display region 3 and the in-screen frame region 4 is suppressed.

Embodiment 3

Hereinafter, a liquid crystal display apparatus according to a third embodiment of the present invention will be described.

Figure 7:
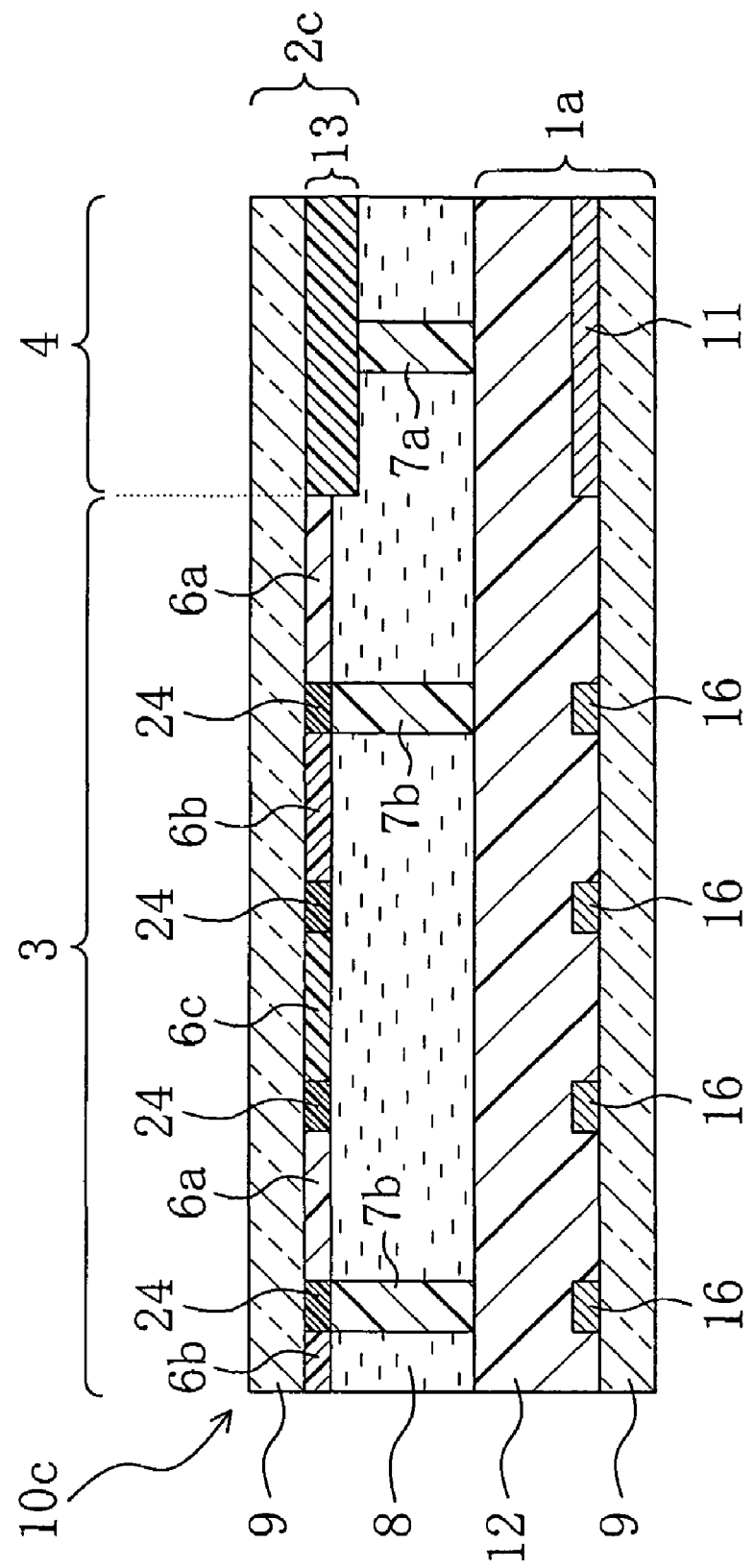
FIG. 7 is a schematic cross-sectional view showing a liquid crystal panel according to a third embodiment of the present invention and corresponds to the schematic cross-sectional view of FIG. 3.

FIG. 7 is a schematic cross-sectional view showing a liquid crystal panel 10c. This cross-sectional view corresponds to the schematic cross-sectional view of FIG. 3 used in the first embodiment. As in FIG. 3, an active matrix substrate 1a shown in FIG. 7 is simplified in its structure on a substrate.

The liquid crystal panel 10c includes: the active matrix substrate 1a functioning as an element substrate; color filter substrates 2c opposed to the active matrix substrate 1a; and a liquid crystal layer 8 sandwiched and held between the substrates 1a and 2c and forming a display medium layer.

The active matrix substrate 1a and the liquid crystal layer 8 are substantially the same as those described in the first embodiment, and detailed description thereof will be omitted.

Each of the color filter substrates 2c has a structure in which a color filter layer 6 and a common electrode (not shown) are stacked in this order over an insulating transparent substrate 9.

In the color filter layer 6, each pixel of the active matrix substrate 1a is associated with one of colored layers of a red layer 6a, a green layer 6b and a blue layer 6c, a black matrix 24 for preventing light from reaching portions between these colored layers is provided between the colored layers, and a light-blocking layer 13 thicker than the black matrix 24 is provided in an in-screen frame region 4 to surround the colored layers and the black matrix 24.

Spacers oriented substantially perpendicularly to the insulating transparent substrate 9 are provided on the common electrode to define the thickness of the liquid crystal layer 8 sandwiched and held between the active matrix substrate 1a and the color filter substrates 2c.

These spacers are constituted by first spacer parts 7a provided in the in-screen frame region 4 and second spacer parts 7b associated with black matrix 24 in an in-screen display region 3. The height of the first spacer parts 7a is adjusted to be smaller than that of the second spacer parts 7b in such a manner that the sum of the height of the first spacer parts 7a and the thickness of the light-blocking layer 13 is substantially equal to the sum of the height of the second spacer parts 7b and the thickness of the color filter layer 6 (black matrix 24.)

As in the first and second embodiments, the expression, "substantially equal" means that the difference between these sums is 0.1 µm or less. If the difference is 0.1 µm or less in this way, variation of a color tone due to retardation is hardly perceived.

In this manner, the upper edge of the first spacer parts 7a in the in-screen frame region 4 and the upper edge of the second spacer parts 7b in the in-screen display region 3 are substantially at the same level.

In addition, the black matrix 24 having the light-blocking property and provided between the plurality of colored layers in the color filter layer 6 overlays the second spacer parts 7b in the in-screen display region 3. Accordingly, even if scattering or transmission of light is caused by the second spacer parts 7b, display quality in the screen is not degraded.

A method for fabricating the liquid crystal panel 10c according to the third embodiment of the present invention is substantially the same as that of the first embodiment. Therefore, only a method for fabricating the color filter substrates 2c, which is a feature of the third embodiment, will be described with reference to FIG. 8.

<Process of Fabricating Color Filter Substrate>

Hereinafter, a process of fabricating a color filter substrate according to the third embodiment of the present invention will be described with reference to schematic cross-sectional views of FIGS. 7 and 8.

As in the first embodiment, before the process, dry films in each of which a resin film made of a photosensitive resin (negative type) containing dispersed pigments of red, green or blue is sandwiched and held between release films such as polyethylene terephthalate (PET) films are prepared.

First, one of release films at one side of a red dry film is peeled off, the red dry film is bonded onto the insulating transparent substrate 9 with the face thereof from which the release film has been peeled off pressed against the insulating transparent substrate 9, and then the other release film is peeled off. In this manner, a red photosensitive resin film is transferred to the insulating transparent substrate 9.

Next, the transferred red photosensitive resin film is exposed to light using a photomask and developed for pattern formation, thereby forming a red layer 6a.

Then, with respect to green, the same process as that for red is repeated, thereby forming a green layer 6b in a part of the in-screen display region 3 associated with given pixels.

Thereafter, with respect to blue, the same process as those for red and green is repeated, thereby forming a blue layer 6c in a part of the in-screen display region 3 associated with given pixels. In this manner, the red layer 6a, the green layer 6b and the blue layer 6c are formed in the in-screen display region 3. The order of forming the red, green and blue colored layers is not limited to the above order.

Then, a photosensitive resin film in which black pigments are dispersed is transferred by a dry-film laminating process onto the entire substrate to cover the red layer 6a, the green layer 6b and the blue layer 6c, thereby forming a black-matrix prototype film 25. The black-matrix prototype film 25 is approximately twice as thick as each colored layer.

Figure 8A:
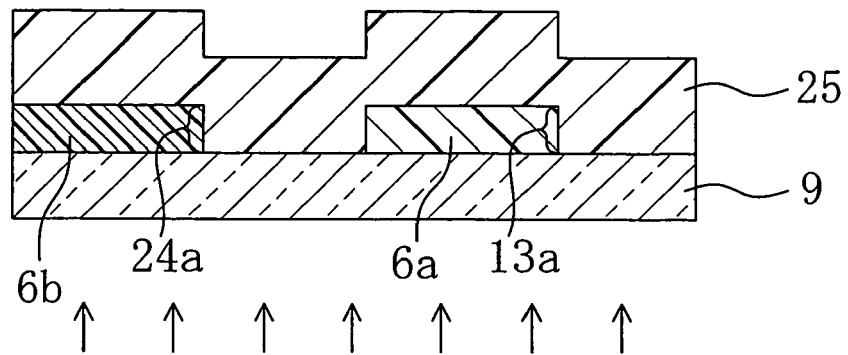
FIGS. 8A through 8C are schematic cross-sectional views showing respective process steps of fabricating a color filter substrate constituting the liquid crystal panel of the third embodiment.

Subsequently, as shown in FIG. 8A, the black-matrix prototype film 25 is exposed to light via the insulating transparent substrate 9 using the red layer 6a, the green layer 6b and the blue layer 6c as a mask, so that the black-matrix prototype film 25 between the colored layers and in the in-screen frame region 4 is cured, thereby forming a black-matrix prototype portion 24a and a light-blocking-layer lower layer portion 13a.

Figure 8B:
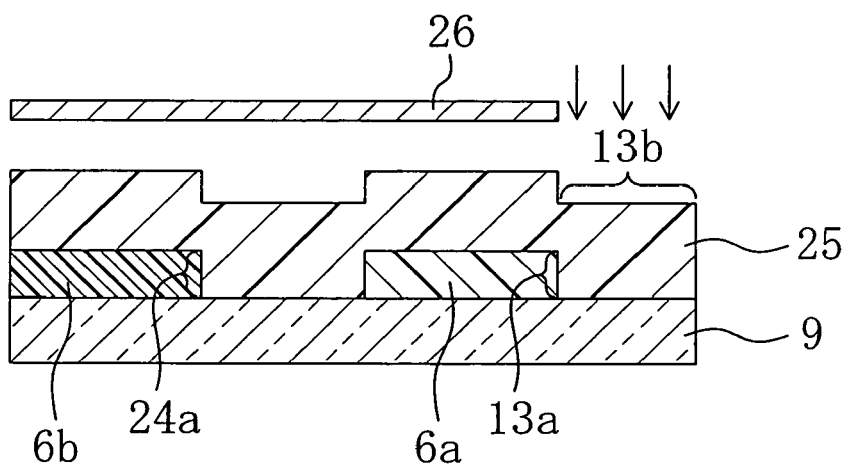

Thereafter, as shown in FIG. 8B, a photomask 26 is positioned so as to prevent light from reaching the colored layers and the black-matrix prototype portion 24a, i.e., the in-screen display region 3, and then light exposure is performed using the photomask 26. Subsequently, the black-matrix prototype film 25 in the in-screen frame region 4 is cured, thereby forming a light-blocking-layer upper layer portion 13b.

Figure 8C:
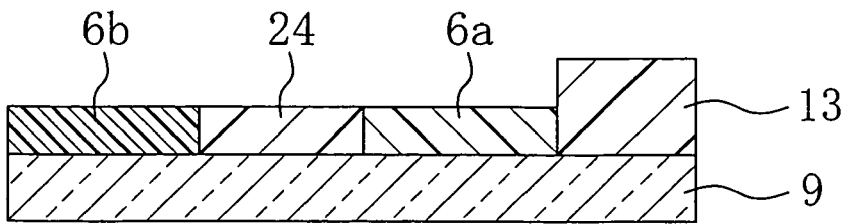

Then, development is performed, so that a black matrix 24 is formed between the red layer 6a, the green layer 6b and the blue layer 6c as shown in FIG. 8C. In this manner, a color filter layer 6 including a light-blocking layer 13 in the in-screen frame region 4 is formed.

Then, a transparent conductive film (with a thickness of about 10 nm) such as an ITO film is deposited by a sputtering process over the entire substrate, i.e., over the color filter layer 6. Subsequently, the film is patterned by a PEP, thereby forming a common electrode. Instead of the ITO film, a transparent conductive film such as an indium zinc oxide (IZO) film may be used as long as this film has a desired electric resistance value.

Thereafter, a photosensitive resin film for forming spacers is transferred to the entire substrate including the common electrode, by a dry-film laminating process.

Then, the transferred photosensitive resin film is exposed to light using a photomask and developed for pattern formation, thereby forming spacers including first spacer parts 7a and second spacer parts 7b. At this time, exposure time for the in-screen frame region 4 is set shorter than that for the in-screen display region 3, so that second spacer parts 7b is formed in the in-screen display region 3 and first spacer parts 7a having a height smaller than the second spacer parts 7b are formed in and the in-screen frame region 4.

Then, a polyimide resin is applied onto the entire substrate including the common electrode, thereby forming an alignment film.

In this manner, a color filter substrate 2c is fabricated.

As described above, in the color filter substrates 2c according to the present invention and the liquid crystal panel 10c including the color filter substrates 2c, the first spacer parts 7a and the second spacer parts 7b are formed in the in-screen frame region 4 and the in-screen display region 3, respectively, of each of the color filter substrates 2c and are oriented substantially perpendicularly to the insulating transparent substrate 9. In addition, the height of the first spacer parts 7a is adjusted to be smaller than that of the second spacer parts 7b by the thickness of the blue layer 6c in such a manner that the sum of the height of the first spacer parts 7a and the thickness of the light-blocking layer 13 is substantially equal to the sum of the height of the second spacer parts 7b and the thickness of the color filter layer 6 (black matrix 24.) Accordingly, the upper edge of the first spacer parts 7a in the in-screen frame region 4 and the upper edge of the second spacer parts 7b in the in-screen display region 3 are substantially at the same level. This eliminates the level difference between the in-screen frame region 4 and the in-screen display region 3 due to the presence of the light-blocking layer 13 provided in the in-screen frame region 4 of each of the color filter substrates 2c, so that occurrence of color irregularities near the boundary between the in-screen display region 3 and the in-screen frame region 4 is suppressed. In addition, the black matrix 24 with the light-blocking property overlays spacers (second spacer parts 7b) in the in-screen display region 3. Accordingly, even if scattering or transmission of light is caused by these spacers, display quality in the screen is not degraded.

Embodiment 4

Hereinafter, a liquid crystal display apparatus according to a fourth embodiment of the present invention will be described.

Figure 9:
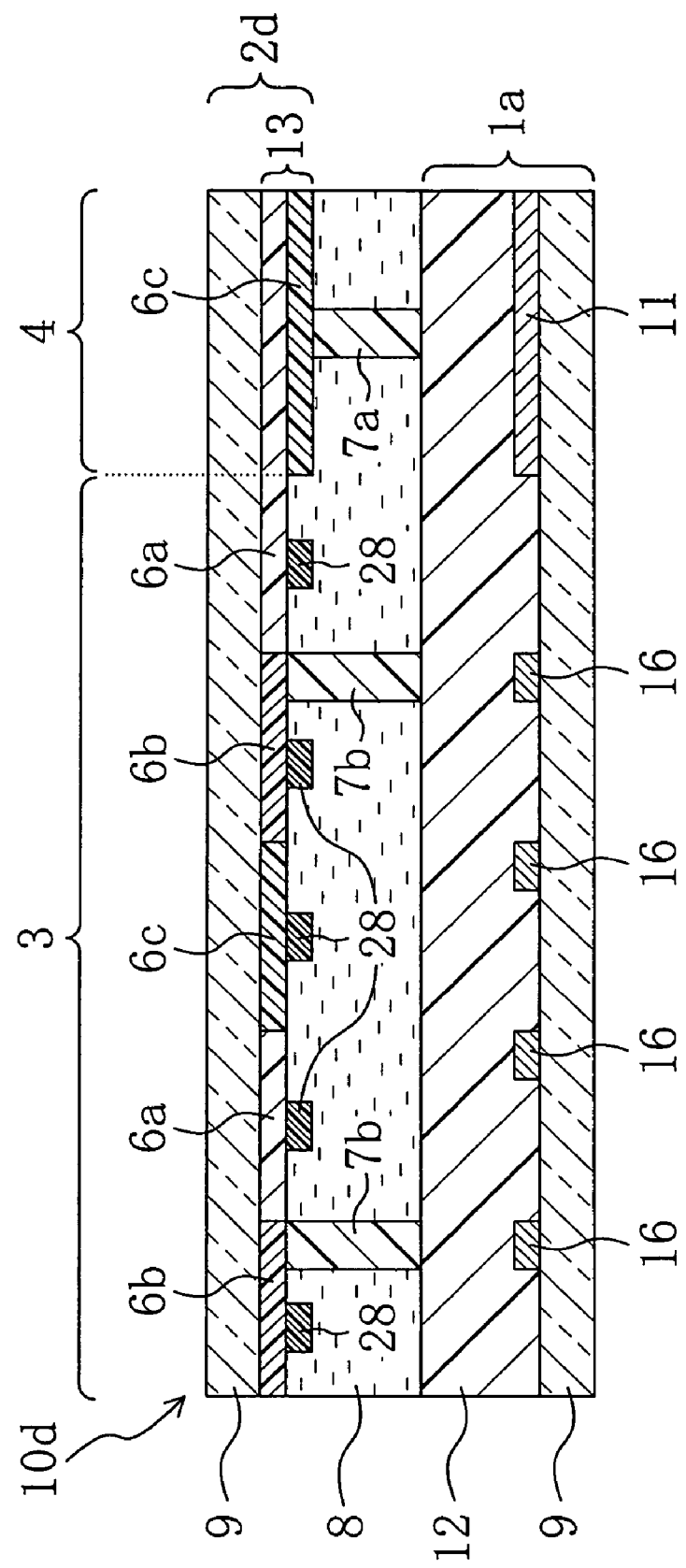
FIG. 9 is a schematic cross-sectional view showing a liquid crystal panel according to a fourth embodiment of the present invention and corresponds to the schematic cross-sectional view of FIG. 3.

FIG. 9 is a schematic cross-sectional view showing a liquid crystal panel 10d. This cross-sectional view corresponds to the schematic cross-sectional view of FIG. 3 used in the first embodiment. As in FIG. 3, an active matrix substrate 1a shown in FIG. 9 is simplified in its structure on a substrate.

The liquid crystal panel 10d includes: the active matrix substrate 1a functioning as an element substrate; color filter substrates 2d opposed to the active matrix substrate 1a; and a liquid crystal layer 8 sandwiched and held between the substrates 1a and 2d and forming a display medium layer.

The active matrix substrate 1a and the liquid crystal layer 8 are substantially the same as those described in the first embodiment, and detailed description thereof will be omitted.

The color filter substrates 2d are the same as the color filter substrates 2a of the first embodiment in structure except for the structure of projections 28. Hereinafter, the structure of the projections 28 will be mainly described.

The projections 28 are used for controlling orientation of liquid crystal molecules constituting the liquid crystal layer 8 and are provided on a color filter layer 6 in locations associated with respective colored layers.

More specifically, the projections 28 are provided on a common electrode (not shown) on the color filter layer 6.

The projections 28 are made of a material constituting first spacer parts 7a and second spacer parts 7b. Accordingly, if exposure time for a part corresponding to the projections 28 is set shorter than the other part during light exposure of a photosensitive resin film for forming the first spacer parts 7a and the second spacer parts 7b in processes of fabricating the color filter substrates of the first and third embodiments, the projections 28 are formed on the color filter layer 6 (the common electrode.) Therefore, specific description of a process of fabricating the color filter substrates 2d will be omitted.

In addition to advantages obtained in the first embodiment, the color filter substrates 2d according to the present invention and the liquid crystal panel 10d including the color filter substrates 2d are capable of controlling orientation of liquid crystal molecules constituting the liquid crystal layer 8 by utilizing the projections 28 as described above.

Embodiment 5

Hereinafter, a liquid crystal display apparatus according to a fifth embodiment of the present invention will be described.

Figure 10:
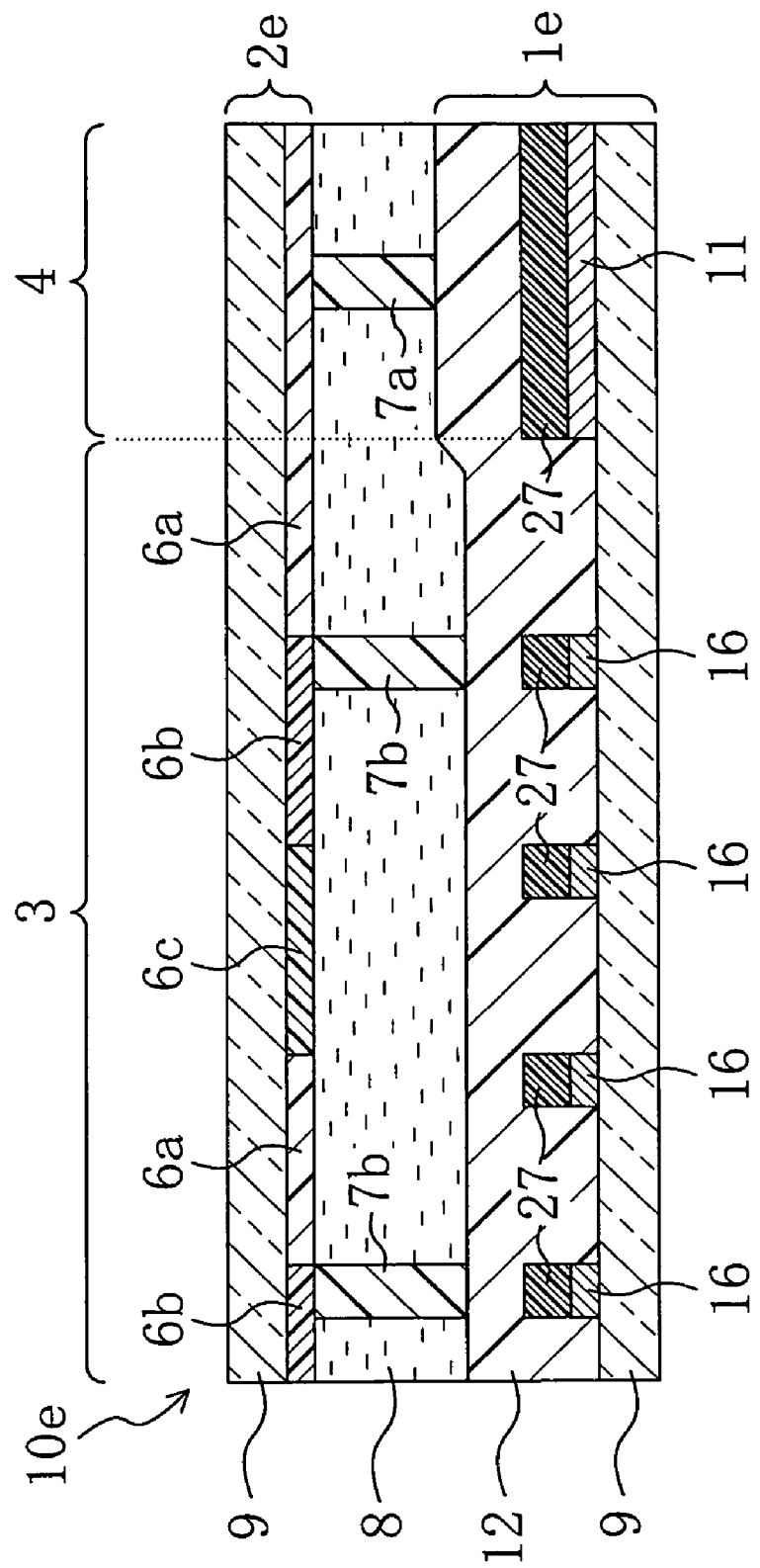
FIG. 10 is a schematic cross-sectional view showing a liquid crystal panel according to a fifth embodiment of the present invention and corresponds to the schematic cross-sectional view of FIG. 3.

FIG. 10 is a schematic cross-sectional view showing a liquid crystal panel 10e. This cross-sectional view corresponds to the schematic cross-sectional view of FIG. 3 used in the first embodiment. As in FIG. 3, an active matrix substrate 1e shown in FIG. 10 is simplified in its structure on a substrate.

The liquid crystal panel 10e includes: the active matrix substrate 1e functioning as an element substrate; color filter substrates 2e opposed to the active matrix substrate 1e; and a liquid crystal layer 8 sandwiched and held between these substrates 1e and 2e and forming a display medium layer.

The active matrix substrate 1e is substantially the same as the active matrix substrate 1a of the first embodiment except for the structure of a light-blocking layer 27 provided at the element-substrate side, and the structure of the light-blocking layer 27 will be mainly described.

The light-blocking layer 27 at the element-substrate side is provided to cover TFTs 21, source lines 16 and the entire region of an in-screen frame region 4.

A part (not shown) of the light-blocking layer 27 located on TFTs 21 blocks light striking on a semiconductor layer 22 (channel part) from the above, thus suppressing occurrence of leakage current by light.

A part of the light-blocking layer 27 located in the in-screen frame region 4 is not directly related to image display because of its location, and blocks light from a backlight or the like necessary for image display in an in-screen display region.

When the liquid crystal display apparatus is mounted on a casing or a frame, the part of the light-blocking layer 27 in the in-screen frame region 4 is placed on a portion surrounding an opening of the casing or the frame. Therefore, under consideration of a mounting margin, the part of the light-blocking layer 27 has a width (several millimeters) much larger than the width (about 10 μm) of the part of the light-blocking layer 27 provided on the source lines 16.

In view of this, as shown in FIG. 10, in the in-screen display region 3, the surface of an interlayer insulating film 12 on the light-blocking layer 27 is flat because the thickness of the narrow light-blocking layer 27 is reduced as a following effect of reflowing a photosensitive resin film constituting the interlayer insulating film 12. On the other hand, in the in-screen frame region 4, the light-blocking layer 27 is wide, so that the following effect is small and, as a result, the surface of the interlayer insulating film 12 is higher than that in the in-screen display region 3. This causes a level difference in the surface of the interlayer insulating film 12 between the in-screen display region 3 and the in-screen frame region 4.

Unlike the light-blocking layer 13 of the color filter substrates 2a in the first embodiment, the color filter substrates 2e include no blue layer 6c in the in-screen frame region 4.

Each of the color filter substrates 2e has a multilayer structure in which a color filter layer 6 and a common electrode (not shown) are stacked in this order over an insulating transparent substrate 9.

Spacers oriented substantially perpendicularly to the insulating transparent substrate 9 are provided on the common electrode to define the thickness of the liquid crystal layer 8 sandwiched and held between the active matrix substrate 1e and the color filter substrates 2e.

These spacers are constituted by first spacer parts 7a provided in the in-screen frame region 4 and second spacer parts 7b provided between pixels in the in-screen display region 3. The height difference between of the first spacer parts 7a and the second spacer parts 7b is substantially equal to the surface level difference between the in-screen frame region 4 and the in-screen display region 3. Accordingly, the height of the first spacer parts 7a is adjusted to be smaller than that of the second spacer parts 7b in such a manner as to eliminate the level difference in the surface of the interlayer insulating film 12 between the in-screen display region 3 and the in-screen frame region 4. As a result, occurrence of color irregularities near the boundary between the in-screen display region 3 and the in-screen frame region 4 is suppressed.

As in the first, second and third embodiments, the expression, "substantially equal" means that the difference between these sums is 0.1 μm or less. If the difference is 0.1 μm or less in this way, variation of a color tone due to retardation is hardly perceived.

The liquid crystal layer 8 is substantially the same as that in the first embodiment, and detailed description will be omitted.

Now, a method for fabricating a liquid crystal panel 10e according to the fifth embodiment of the present invention will be described.

<Process of Fabricating Active Matrix Substrate>

Hereinafter, a process of fabricating an active matrix substrate according to the fifth embodiment of the present invention will be described with reference to the schematic cross-sectional view of FIG. 10.

First, gate lines 15, gate electrodes 15a, capacitor lines 18, extended gate lines 11, a gate insulating film 23, a semiconductor layer 22, source lines 16, source electrode 16a, drain electrodes 17, extended drain electrodes 17a and channel parts (TFTs 21) of the semiconductor layer are formed on an insulating transparent substrate 9 through the process steps described in the first embodiment.

Next, a photosensitive resin film in which black pigments are dispersed is transferred to the entire substrate by a dry-film laminating process, and then the film is patterned by a PEP to cover the source lines 16, the TFTs 21 and an in-screen frame region 4, thereby forming a light-blocking layer 27.

Subsequently, the entire substrate including the light-blocking layer 27 and the extended drain electrodes 17a is coated with an acrylic positive photosensitive transparent resin with a thickness of about 2.5 μm, thereby forming an interlayer insulating film 12.

Then, parts of the interlayer insulating film 12 associated with the extended drain electrodes 17a are removed by etching, thereby forming contact holes 19.

Thereafter, a transparent conductive film (with a thickness of about 10 nm) made of an ITO film is deposited by a sputtering process over the entire substrate, i.e., over the interlayer insulating film 12. Subsequently, the film is patterned by a PEP, thereby forming pixel electrodes 20. Instead of the ITO film, a transparent conductive film such as an indium zinc oxide (IZO) film may be used as long as this film has a desired electric resistance value.

Then, a polyimide resin is applied onto the entire substrate including the pixel electrodes 20 to a thickness of about 100 nm, thereby forming an alignment film.

In this manner, an active matrix substrate 1e is fabricated.

<Process of Fabricating Color Filter Substrate>

To fabricate the color filter substrates 2e, it is sufficient to omit the blue layer 6c constituting the light-blocking layer 13 in the in-screen frame region 4 of the color filter substrates 2a of the first embodiment. Therefore, detailed description thereof will be omitted.

<Process of Fabricating Liquid Crystal Panel>

A process of fabricating a liquid crystal panel according to this embodiment is the same as that in the first embodiment, and thus detailed description thereof will be described.

In the foregoing manner, the liquid crystal panel 10e according to the present invention is fabricated.

As described above, in the liquid crystal panel 10e according to the present invention, the light-blocking layer 27 is provided in the in-screen frame region 4 of the active matrix substrate 1e, and the first spacer parts 7a and the second spacer parts 7b are formed in the in-screen frame region 4 and the in-screen display region 3, respectively, of each of the color filter substrates 2e to define the thickness of the liquid crystal layer 8. In addition, the height of the first spacer parts 7a is adjusted to be smaller than that of the second spacer parts 7b so as to eliminate the level difference in the surface of the interlayer insulating film 12 between the in-screen display region 3 and the in-screen frame region 4. Accordingly, the height difference between the first spacer parts 7a formed in the in-screen frame region 4 and the second spacer parts 7b formed in the in-screen display region 3 eliminates the surface level difference between the in-screen display region 3 and the in-screen frame region 4 in the active matrix substrate 1e. As a result, occurrence of color irregularities near the boundary between the in-screen display region 3 and the in-screen frame region 4 is suppressed.

In the fifth embodiment, the light-blocking layer is provided in the in-screen frame region of the active matrix substrate in addition to the structure of the first embodiment. However, the fifth embodiment is applicable to the structures of the second, third and fourth embodiments.

Now, specific experiments will be described.

As an example of the present invention (hereinafter, referred to as an inventive example), a liquid crystal panel was fabricated in the same manner as in the fifth embodiment.

Specifically, an active matrix substrate 1e including a light-blocking layer 27 with a thickness of 1.5 μm and an interlayer insulating film 12 with a thickness of 2.5 μm was fabricated. Color filter substrates 2e were fabricated with the height of first spacer parts 7a in an in-screen frame region 4 set at 3.0

μm and the height of the second spacer parts 7b in an in-screen display region 3 set at 3.4 μm. These substrates 1e and 2e were bonded together and a liquid crystal material was injected into a gap between the substrates 1e and 2e and the gap is sealed, thereby fabricating a liquid crystal panel.

Now, a comparative example will be described in comparison with the inventive example.

Specifically, color filter substrates were fabricated with the height of spacers in an in-screen frame region and an in-screen display region set at 3.4 μm, and an active matrix substrate 1e that is the same as that used in the inventive example was prepared. Then, these substrates were bonded together and a liquid crystal material was injected into a gap between the substrates and the gap is sealed, thereby fabricating a liquid crystal panel.

Hereinafter, results of the inventive example and the comparative example will be described with reference to the graphs in FIGS. 11A and 11B.

Figure 11A:
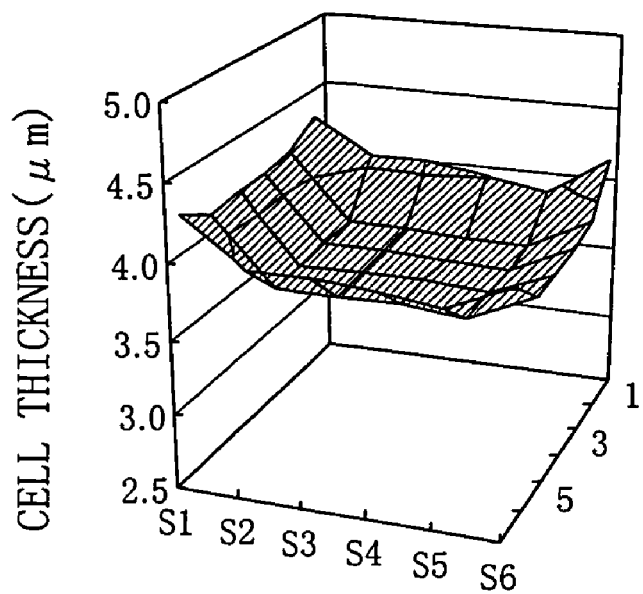
FIGS. 11A and 11B are graphs showing respective distributions of cell thicknesses in in-screen display regions of liquid crystal panels fabricated according to an example of the present invention and a comparative example.
Figure 11B:
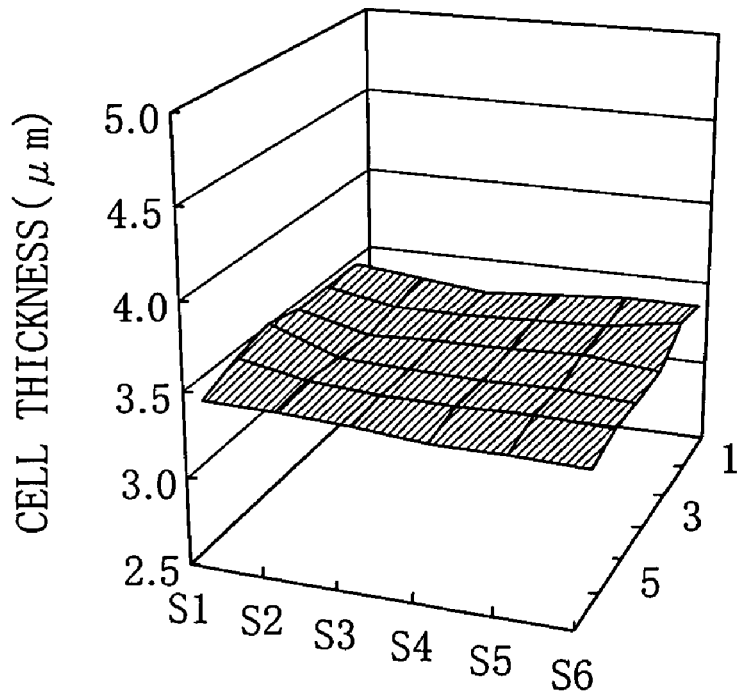

FIG. 11A is a graph showing distribution of cell thicknesses in the in-screen display region of the liquid crystal panel fabricated in the comparative example. FIG. 11B is a graph showing distribution of cell thicknesses in the in-screen display region of the liquid crystal panel fabricated in the inventive example. The panel sizes of the liquid crystal panels fabricated in the comparative example and the inventive example are both 15 inches. In FIGS. 11A and 11B, the cell thicknesses of each liquid crystal panels are measured at every given distance and the results are plotted. The abscissa in each graph (including S1 through S6) indicates the gate line direction of the liquid crystal panel and the ordinate (including 1, 3 and 5) indicates the source line direction of the liquid crystal panel.

The surface of the active matrix substrate 1e had a surface level difference of 0.3 μm to 0.4 μm between the in-screen frame region and the in-screen display region because of the presence of a light-blocking layer 27 formed in the in-screen frame region 4 of the active matrix substrate 1e.

In the comparative example, the height of the spacers was uniform between the in-screen frame region and the in-screen display region, so that the cell thickness near the in-screen frame region is larger than that in a center portion of the in-screen display region depending on the surface level difference of 0.3 μm to 0.4 μm described above. Accordingly, color irregularities were observed in a peripheral portion of the liquid crystal panel.

On the other hand, in the inventive example, the height of first spacer parts 7a in the in-screen frame region 4 was set at 3.0 μm and the height of second spacer parts 7b in the in-screen display region 3 was set at 3.4 μm, so that the above surface level difference of 0.3 μm to 0.4 μm was eliminated. Accordingly, no difference was observed between the cell thickness near the in-screen frame region and the cell thickness in a center portion of the in-screen display region, i.e., the cell thickness was almost uniform in the entire in-screen region. As a result, the liquid crystal panel has an excellent display quality.

As described above, according to the present invention, occurrence of color irregularities near the boundary between an in-screen display region and an in-screen frame region is suppressed, so that the present invention is useful for color liquid crystal display apparatuses.

What is claimed is:

1. A color filter substrate comprising:
   a transparent substrate;
   a color filter layer provided on the transparent substrate, including a plurality of colored layers and constituting an in-screen display region; and
   an in-screen frame region defined around the in-screen display region,
   wherein a light-blocking layer is provided in the in-screen frame region to cover the transparent substrate,
   a first spacer part and a second spacer part are formed in the in-screen frame region and the in-screen display region, respectively, and are oriented substantially perpendicularly to the transparent substrate,
   the sum of the length in the perpendicular orientation of the first spacer part and the thickness of the light-blocking layer is substantially equal to the sum of the length in the perpendicular orientation of the second spacer part and the thickness of the color filter layer, and
   the thickness of the light-blocking layer is greater than the thickness of the color filter layer.

2. The color filter substrate of claim 1, wherein the light-blocking layer is thicker than the color filter layer, and
   the height of the first spacer part is smaller than that of the second spacer part.

3. The color filter substrate of claim 1, wherein a black matrix for preventing light from reaching portions between the colored layers is provided between the colored layers in the color filter layer.

4. The color filter substrate of claim 3, wherein the second spacer part is located in such a manner that the black matrix overlays the second spacer, and
   the sum of the height of the first spacer part and the thickness of the light-blocking layer is substantially equal to the sum of the height of the second spacer part and the thickness of the black matrix.

5. The color filter substrate of claim 4, wherein the light-blocking layer is thicker than the black matrix, and
   the height of the first spacer part is smaller than that of the second spacer part.

6. The color filter substrate of claim 1, wherein colored layers associated with red, green and blue, respectively, are arranged in the color filter layer, and
   the light-blocking layer is formed by stacking materials constituting the colored layers associated with red and blue, respectively, in the color filter layer.

7. The color filter substrate of claim 1, wherein the second spacer part is formed by stacking a material constituting the first spacer part and a material constituting at least one of the colored layers in the color filter layer.

8. The color filter substrate of claim 1, wherein liquid crystal molecules are oriented with respect to a side of the transparent substrate toward the color filter layer, and
   the in-screen display region includes a projection made of a material constituting the first and second spacer parts and used for controlling orientation of the liquid crystal molecules.

9. The color filter substrate of claim 1, wherein the color filter layer, the light-blocking layer and the first and second spacer parts are formed by dry-film laminating processes in each of which a resin film formed on a film is transferred to the transparent substrate.

10. A display apparatus comprising:
    the color filter substrate of claim 1;
    an element substrate opposed to the color filter substrate; and
    a display medium layer sandwiched and held between the substrates.

11. A color filter substrate comprising:
    a transparent substrate;
    a color filter layer provided on the transparent substrate, including a plurality of colored layers and constituting an in-screen display region; and an in-screen frame region defined around the in-screen display region, wherein a light-blocking layer is provided in the in-screen frame region to cover the transparent substrate, a first spacer part and a second spacer part are formed in the in-screen frame region and the in-screen display region, respectively, and are oriented substantially perpendicularly to the transparent substrate, a black matrix for preventing light from reaching portions between the colored layers is provided between the colored layers in the color filter layer, the second spacer part is located in such a manner that the black matrix overlays the second spacer, the sum of the length in the perpendicular orientation of the first spacer part and the thickness of the light-blocking layer is substantially equal to the sum of the length in the perpendicular orientation of the second spacer part and the thickness of the black matrix, the light-blocking layer is thicker than the black matrix, and the length in the perpendicular orientation of the first spacer part is smaller than that of the second spacer part.

* * * * *